United States Patent
Pitt et al.

(10) Patent No.: US 9,514,368 B2
(45) Date of Patent: Dec. 6, 2016

(54) CONTEXTUAL INFORMATION OF VISUAL MEDIA

(71) Applicants: Lance D. Pitt, Kent, WA (US); Gordon John Hines, Kirkland, WA (US)

(72) Inventors: Lance D. Pitt, Kent, WA (US); Gordon John Hines, Kirkland, WA (US)

(73) Assignee: Telecommunications Systems, Inc., Annapolis, MD (US)

( * ) Notice: Subject to any disclaimer, the term of this patent is extended or adjusted under 35 U.S.C. 154(b) by 0 days.

(21) Appl. No.: 14/789,688

(22) Filed: Jul. 1, 2015

(65) Prior Publication Data

US 2016/0140398 A1 May 19, 2016

Related U.S. Application Data

(60) Provisional application No. 62/079,867, filed on Nov. 14, 2014.

(51) Int. Cl.
| | |
|---|---|
| G06K 9/46 | (2006.01) |
| G06K 9/00 | (2006.01) |
| G06F 17/30 | (2006.01) |
| G06T 7/00 | (2006.01) |

(52) U.S. Cl.
CPC ..... *G06K 9/00744* (2013.01); *G06F 17/30256* (2013.01); *G06F 17/30864* (2013.01); *G06K 9/00818* (2013.01); *G06T 7/0085* (2013.01); *G06T 2207/20164* (2013.01); *G06T 2210/61* (2013.01)

(58) Field of Classification Search
CPC ............ G06K 9/00744; G06K 9/00818; G06K 9/4609; G06T 7/0083; G06T 7/0085; G06T 2207/10016; G06T 2207/20164; G06T 2210/61; G11B 27/28; G06F 17/2235; G06F 17/2247; G06F 17/30256; G06F 17/30864
See application file for complete search history.

(56) References Cited

U.S. PATENT DOCUMENTS

| | | | |
|---|---|---|---|
| 7,028,253 B1 | 4/2006 | Lieberman et al. | |
| 7,184,959 B2 | 2/2007 | Gibbon et al. | |
| 7,933,451 B2 | 4/2011 | Kloer | |
| 8,024,311 B2 | 9/2011 | Wood et al. | |
| 8,666,146 B1* | 3/2014 | Smolic | G06T 3/0093 348/42 |
| 2004/0267753 A1* | 12/2004 | Hoche | G06F 17/30719 |
| 2008/0300872 A1* | 12/2008 | Basu | G06F 17/30017 704/235 |
| 2009/0138906 A1* | 5/2009 | Eide | G06F 17/30038 725/32 |
| 2011/0035382 A1 | 2/2011 | Bauer et al. | |
| 2011/0173130 A1* | 7/2011 | Schaefer, IV | G06Q 30/0282 705/347 |
| 2013/0212080 A1* | 8/2013 | Bergman | G06F 17/30994 707/706 |
| 2013/0276041 A1 | 10/2013 | Dutta | |
| 2015/0106078 A1 | 4/2015 | Chang | |
| 2015/0106156 A1 | 4/2015 | Chang et al. | |
| 2016/0140398 A1* | 5/2016 | Pitt | G06K 9/00744 382/176 |

FOREIGN PATENT DOCUMENTS

WO   WO 2011/089575 A1   7/2011

* cited by examiner

*Primary Examiner* — Amir Alavi
(74) *Attorney, Agent, or Firm* — Tarolli, Sundheim, Covell & Tummino LLP

(57) ABSTRACT

An analysis master control can be configured to derive contextual information of visual media that includes extracted information and extrapolated information. The analysis master control can receive the extracted information characterizing visual media from a recognizer. An information finder can be configured to query a plurality of information sources for information based on the extracted information. The analysis master control can also be configured to match information received from the information sources with the extracted information to form the extrapolated information that characterizes the visual media.

18 Claims, 17 Drawing Sheets

200

400

450

CONTEXTUAL INFORMATION OF VISUAL MEDIA

CROSS-REFERENCE TO RELATED APPLICATION

This application claims the benefit of priority to U.S. Provisional Application No. 62/079,867, filed on 14 Nov. 2014, and entitled MEDIA CONTEXTUAL INFORMATION RESOLVER (MCIR), the entirety of which is herein incorporated by reference.

TECHNICAL FIELD

This disclosure relates to systems and methods for determining contextual information for visual media.

BACKGROUND

As technology continues to progress, an increasing variety of digital media is exchanged regularly between peers, between mobile consumers and companies that support those mobile consumers, and between mobile consumers and companies that advertise to those mobile consumers. The multi-directional exchange of this digital media creates a continuous cacophony of information that will rapidly exceed the ability of those who are duly authorized to view and/or use the digital media to fully and correctly interpret; incorrect interpretation could well result in improper or untimely services rendered. Public Safety is one example of a segment of modern society that is often duly authorized to use such information; there may be many other duly authorized users as well. Such duly authorized users can receive a wide variety of media types from a wide variety of sources; mobile devices are able to send text, still images, video clips, and eventually even streaming videos. Media sent to entities that are "duly authorized" can be low resolution or high resolution digital media.

SUMMARY

One example relates to a non-transitory machine readable medium having machine executable instructions that include an analysis master control configured to derive contextual information of visual media that includes extracted information and extrapolated information. The analysis master control can receive the extracted information characterizing visual media from a recognizer. The instructions can also include an information finder configured to query a plurality of information sources for information based on the extracted information. The analysis master control is further configured to match information received from the information sources with the extracted information to form the extrapolated information that characterizes the visual media.

Another example relates to a system that can include a media content information resolver (MCIR) configured to receive visual media from a media source. The system can also include an analysis master control configured to derive contextual information for the visual media that characterizes information extracted from the visual media and information extrapolated for the visual media based on the extracted information. The system can further include a presentation builder configured to generate a contextual document for the MCIR based on the contextual information.

Yet another example relates to a method that can include recognizing shapes in visual media based on identified line segments. The method can also include extracting information from the visual media, wherein the extracted information includes text present in the visual media. The method can further include retrieving information from at least one of a search engine or a database based on the extracted information. The method can yet further include determining extrapolated information based on the retrieved information, wherein contextual information for the visual media includes the extracted information and the extrapolated information.

DETAILED DESCRIPTION

System and methods are described for discovering and presenting contextual information associated with elements extracted from received visual media in order to increase a viewer's understanding of the context of the visual media. The system can include mechanisms for extracting information directly from the visual media (e.g., text, shapes, signs, etc.). Moreover, based on the extracted information, the system can query information sources for additional information that can be employed to determine extrapolated information for the visual media. The contextual information (including the extracted information and the extrapolated information) can be employed to generate a contextual document that includes the visual media and the contextual information. In this manner, the systems and methods described herein can rapidly identify information that can describe a scene captured in the visual media.

Figure 1:
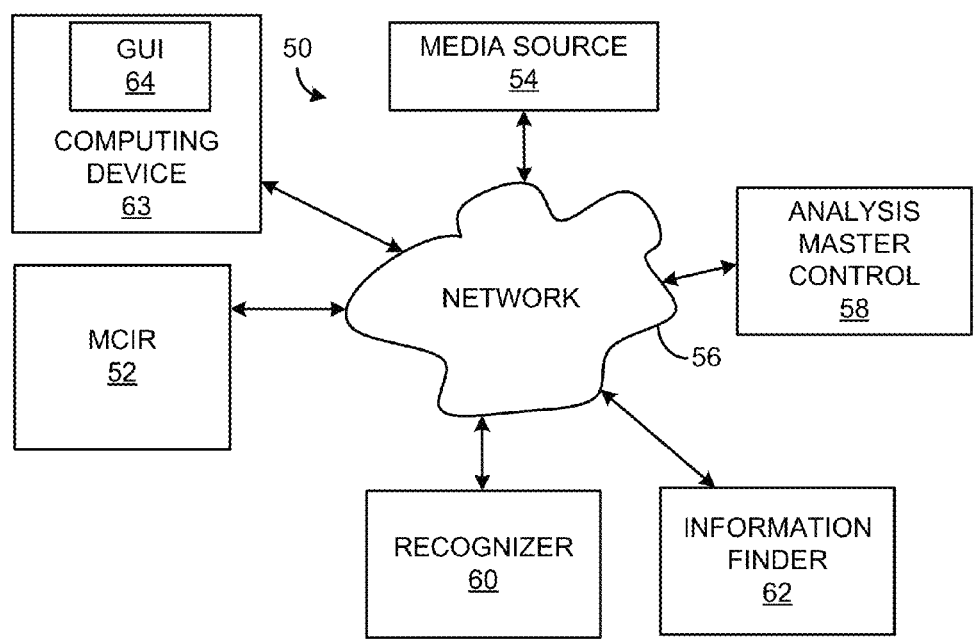
FIG. 1 illustrates an example of a system for determining contextual information for visual media.

FIG. 1 illustrates an example of a system 50 for determining contextual information from visual media for a media contextual information resolver (MCIR) 52. The MCIR 52 can be representative of application software (e.g., an App) executing on a general purpose computer, such as a server, an end-user workstation or a combination thereof. In some examples, the MCIR 52 can be implemented on emergency services terminal, such as in a Public Safety Answering Point (PSAP). In other examples, the MCIR 52 can be implemented in a surveillance system, such as a police surveillance unit, military surveillance unit, a domestic intelligence and security service (e.g., the Federal Bureau of Investigation (FBI)) an external intelligence service (e.g., the Central Intelligence Agency (CIA)), private surveillance or nearly any situation where surveillance is needed and authorized.

The MCIR 52 can include a processing unit (e.g., that includes a processor core) to execute machine readable instructions. The MCIR 52 can also include a non-transitory machine readable medium, such as memory (volatile and/or non-volatile) that is accessible by the processor. The memory can be employed to store the machine readable instructions.

The MCIR 52 can be programmed/configured to receive visual media from a media source 54 via a network 56. The network 56 could be a public network (e.g., the Internet), a private network (e.g., a proprietary network) or a combination thereof (e.g., a Virtual Private Network (VPN)). The media source 54 could include, for example, a device configured to capture visual media, such as a camera. The media source 54 can be implemented, for example, on a traffic camera, a security camera, a satellite camera, a hand-held camera (e.g., a smart phone or other device), etc. The media source 54 can be configured to capture still frames and/or video (e.g., successive still frames). The visual media provided to the MCIR 52 can be in a digital format.

The MCIR 52 can send the visual media received from the media source 54 to an analysis master control 58 via the network 56 along with a request for contextual information related to the visual media. The analysis master control 58 can be implemented, for example, on a server. In some situations, the MCIR 52 and the analysis master control 58 can be implemented on the same server. In some examples, the analysis master control 58 could be implemented in a computing cloud. In other examples, the analysis master control 58 can be implemented as a stand-alone server.

Figure 2:
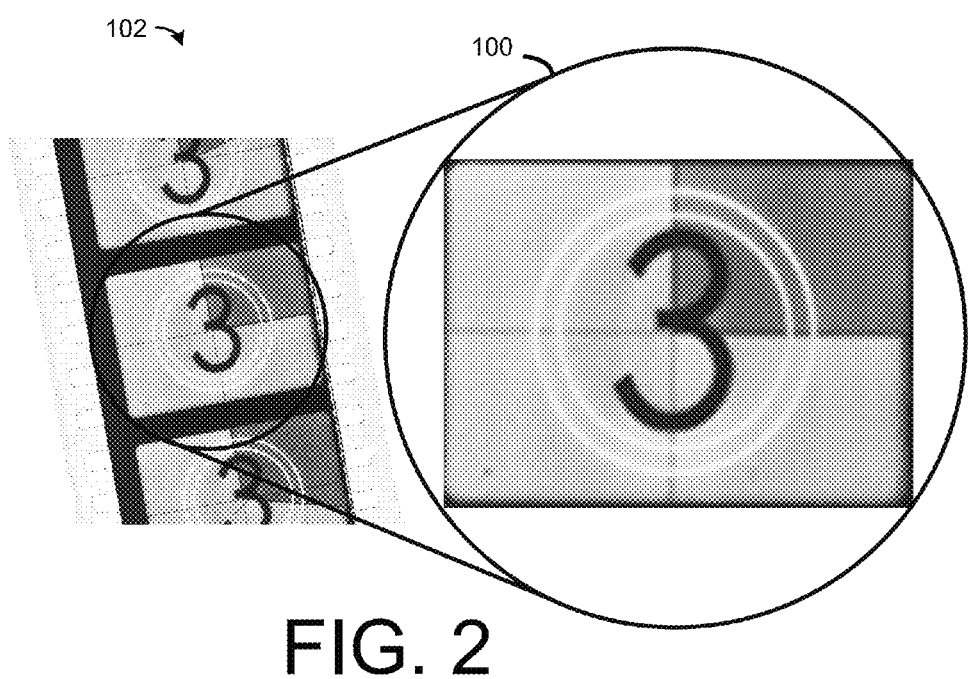
FIG. 2 illustrates an example of video as a collection of single "still" images.

The analysis master control 58 can extract and extrapolate contextual information for the visual media. As noted, the visual media can be a still frame or a video media. In some examples, external systems, such as a recognizer 60 and/or an information finder 62 (e.g., an interface for a search engine and/or a database) can be employed to facilitate that extraction and interpolation of the contextual media information from the visual media. However, in other examples, some or all of the features of the recognizer 60 and/or the information finder 62 can be incorporated into the analysis master control 58. In a first example, (hereinafter, "the first example"), the analysis master control 58 can analyze a still frame of visual media to extract information. The still frame could be a single frame (e.g., a photograph) or a frame extracted from a video freed. For instance, FIG. 2 illustrates a frame 100 of visual media that could be analyzed by the analysis master control 58 in the first example. Video media is simply a sequence of "frames" 102 each of which is essentially a single photo 100. Virtually all forms of "playback" media, including streaming video, are a sequence of frames 102 and each frame can be examined individually as a single instance of that media's version of a "still" image 100.

Figure 3:
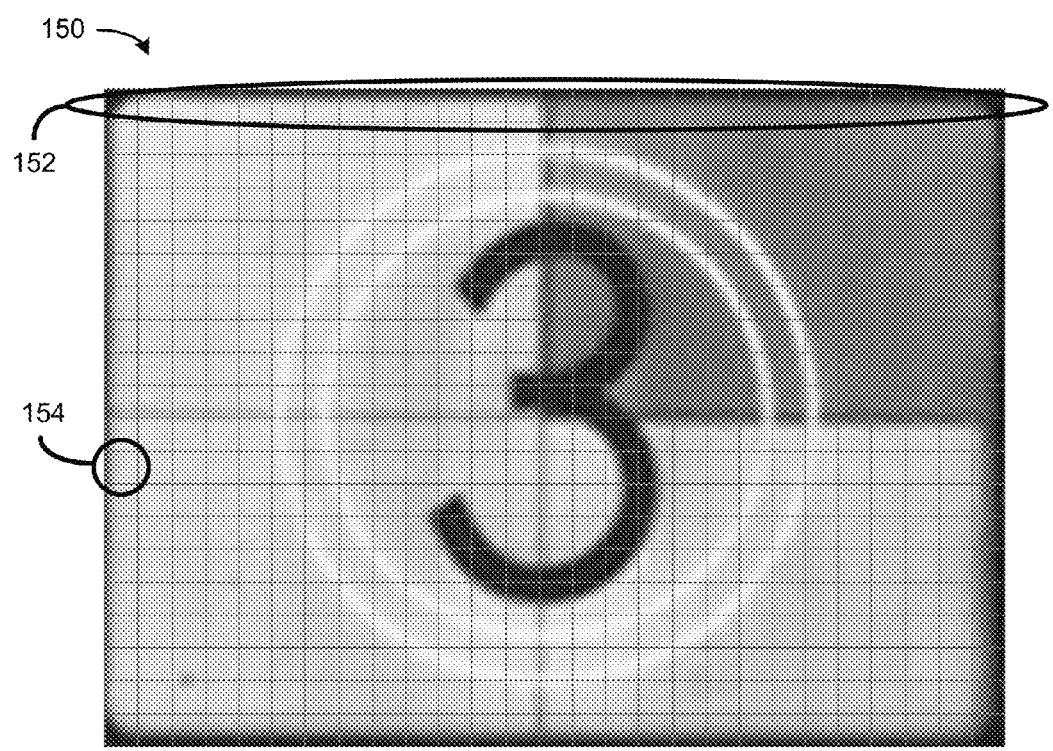
FIG. 3 illustrates an example of a single "still" image as collection of rows each of which is comprised of pixels.

Continuing with the first example, FIG. 3 illustrates processing of a still frame 150 by the analysis master control 58 illustrated in FIG. 1. The still image 150 can be formed of a sequence of horizontal rows 152 comprised of individual pixels 154 that, when displayed in the proper vertical order, become recognizable by human beings as a digital facsimile or reproduction of legacy analog media. Legacy analog media refers to a two-dimensional (2D) recording of a three-dimensional (3D) scene somewhere in the world.

Figure 4:
FIG. 4 illustrates an example of visual media depicting an emergency scene.

As different forms of visual media, including play-back media and still media becomes available to duly authorized users including, but not limited to users at PSAPs responsible for first contact and coordinated dispatch or by the first responder units themselves (e.g. fire, police, medical, hazardous materials (HAZMAT) handlers, etc.) the play-back media and still media may well represent chaotic scenes from a variety of situations. FIG. 4 illustrates a still frame 200 that depicts an example of such an emergency situation, which still frame 200 illustrates a collision between an automobile and a motorcycle.

Referring back to FIG. 1, duly authorized media users often desire contextual information to enhance their situational awareness. However, the more chaotic a situation becomes, the more confusing the visual media can be and the more such duly authorized media users will need improved situational awareness not only for the sake of those persons immediately involved in the situation (e.g. the victims) but for the safety and well-being of whomever may be called upon to respond to the situation (e.g. first responders).

For the purposes of simplification of explanation, the examples described herein concentrate on text extracted from received visual media, but it is to be understood that in other examples, other types of information can be extracted. For instance, the analysis master control 58 can provide the visual media to the recognizer 60 to recognize objects in the visual media. The recognizer 60 can, for example, employ optical character recognition (OCR) to directly recognize text in the visual media and/or by recognizing text associated with landmarks, common objects or recognized faces as a form of meta-data. The extracted information (e.g., text) can be returned to the analysis master control 68. Upon receiving the extracted information of contextual information (e.g., text), the analysis master control 68 can query the information finder 62 for a broad spectrum of alternate sources for additional information with which to better define the context inherent within the visual media.

For example, license plate numbers extracted from the visual media can be employed by the information finder 62 to query a department of motor vehicles database to determine an owner of a vehicle. Upon determining the owner of a vehicle, the information finder 62 can query a telephone directory for contact information (e.g., a telephone number and/or an address) of the owner of a vehicle. Similarly, names of a street extracted from street signs in the visual media can be employed by the information finder 62 to query a map service (e.g., GOOGLE MAPS®) to determine a location of the scene captured by the visual media.

The extrapolated information can be returned to the analysis master control 58. The analysis master control 58 can send the extracted information and the extrapolated information as contextual information for the visual media to the MCIR 52. A computing device 63 can communicate with the network 56. The computing device 63 can be an end-user device, such as a workstation or user terminal. The computing device can include a graphical user interface (GUI) 64 that can output the contextual information for the visual media in a variety of different ways. For instance, in some situations, the contextual information can be output as text or dialog boxes that overlay different portions of the visual media. In other examples, contextual information can be organized and output separately from the visual media. This may be desirable, for instance, in situations where the subject matter of the visual media tends to be graphic in nature. In this situation, the user of GUI 64 may desire to only read the contextual information that describe the scene thereby avoiding potentially traumatizing effects of the viewing the visual media directly. In some examples, the computing device 63 and the MCIR 52 can be implemented on a single computing device. Thus, for purposes of simplification of explanation, a user of the computing device 63 and/or the GUI 64 can be referred to as a user of the MCIR 52.

The user of the MCIR 52 can analyze the contextual information for the visual media (including the extracted information and the extrapolated information) to determine an appropriate course of action that can vary based on the environment in which the system 50 is implemented. For example, in situations where the system 50 is employed in an emergency services dispatching system, such as a PSAP (e.g., a 9-1-1 operation), the visual media may depict an automobile accident (e.g., such as the automobile accident depicted by the image 200 illustrated in FIG. 4). The contextual information for the visual media could be analyzed to assist in determining what type of first responders are needed (e.g., police and/or ambulance) as well as a location of the accident. The user of the MCIR 52 can dispatch the appropriate first responders, and in some example, the user can employ the GUI 64 to forward the visual media as well as the contextual information to the first responders. In other environments of application, users of the MCIR 52 can take alternative actions.

Figure 5:
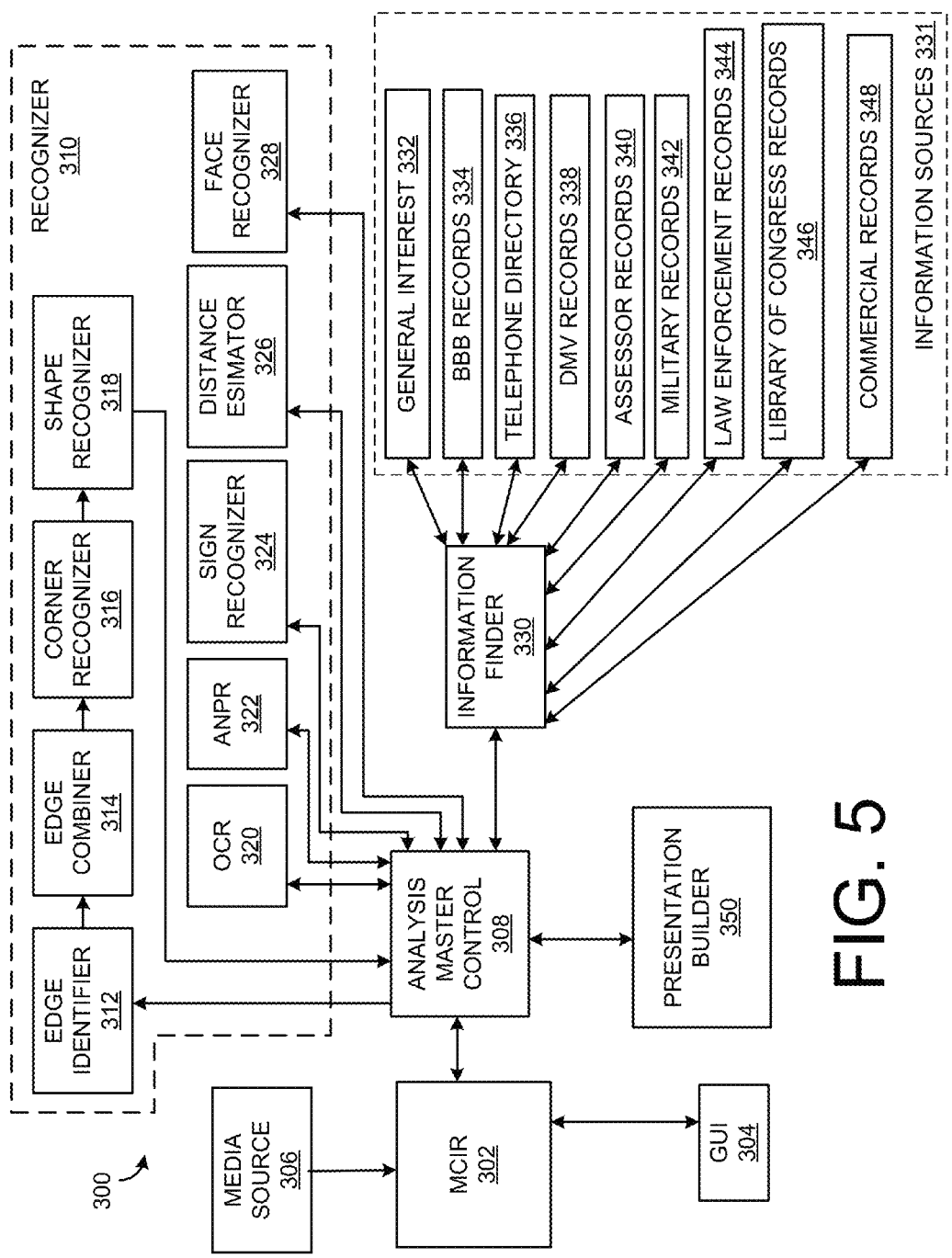
FIG. 5 illustrates another example of a system for determining contextual information for visual media.

FIG. 5 illustrates a block diagram of a system 300 that could be employed, for example, to implement the system 50 illustrated in FIG. 1. The system 300 could be part of a surveillance system. For instance, the system 300 could be deployed in an emergency services system, such as a PSAP. Alternatively, the system 300 could be implemented in a surveillance system, such as a police surveillance units, military surveillance units, a domestic intelligence and security service (e.g., the FBI) an external intelligence service (e.g., the CIA), private surveillance or nearly any situation where surveillance is needed and authorized. However, for purposes of simplification of explanation, the examples described with respect to the system 300 are related to emergency services.

The system 300 can include a MCIR 302 that could be implemented in a computing device (e.g., a server, a workstation, etc.). The MCIR 302 can communicate with a GUI 304 that can receive user input and provide output to the user. The GUI 304 can be implemented on the same computing device as the MCIR 302 or as a separate computing device (e.g., a user terminal). The MCIR 302 can receive visual media from a media source 306. The media source 306 could be, for example, a surveillance camera (e.g., a traffic camera, a security camera, etc.), a handheld camera (e.g., a smartphone or similar device), etc. The visual media could be, for example, a still frame, such as the still frames 102, 150 and 200 illustrated in FIGS. 2-4.

The MCIR 302 can send the visual media received from the media source 306 to an analysis master control 308 along with a request for contextual information for the visual media. The analysis master control 308 can be implemented, for example, on a server. In some situations, the MCIR 302 and the analysis master control 308 can be implemented on the same server. In some examples, the analysis master control 308 could be implemented in a computing cloud. In other examples, the analysis master control 308 can be implemented as a stand-alone server.

The analysis master control 308 can identify contextual information for the visual media, which contextual information can include both extracted and extrapolated information. As noted, the visual media can be a still frame or a video media. Additionally, the analysis master control 308 can employ a recognizer 310 to facilitate extraction of contextual information from the visual media. The recognizer 310 can be representative of a computing device and/or a computing cloud. In some situations, the recognizer 310 can be representative of multiple cloud services. In the example illustrated in FIG. 5, the recognizer 310 can be formed of a plurality of recognizer modules/subcomponents. In some situations, each module can be integrated on a single (virtual or logical) system. In other situations, the each module (or some subset thereof) can be implemented on different systems. The recognizer 310 can employ a variety of techniques, such as OCR, to extract contextual information from the visual media in a manner described herein.

The extracted information, such as text extracted/derived from the visual media can be leveraged by the analysis master control 308 to extrapolate additional contextual information. For example, text extracted signs included in visual media is typically written with very high contrast between the sign's foreground and background; this makes the text from the visual media of the sign easier to parse and recognize even if the visual media is recorded while in motion within a vehicle (See e.g., FIG. 4).

Figure 6:
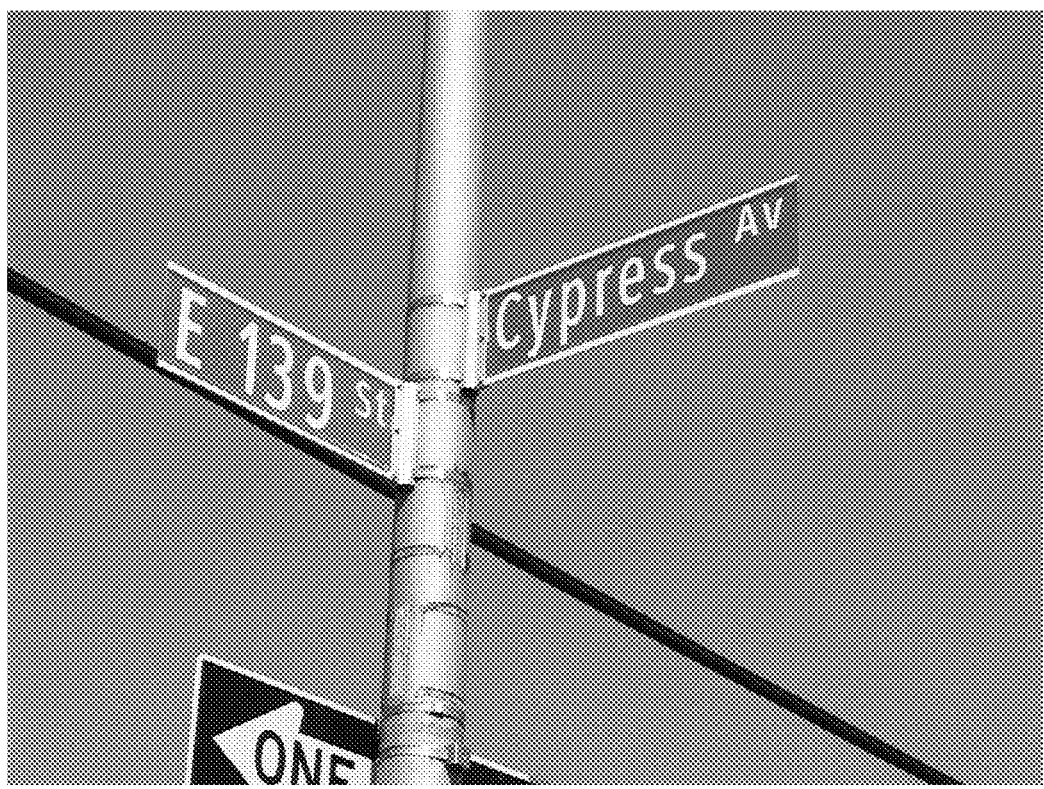
FIG. 6 illustrates an example of visual media depicting street signs.
Figure 7:
FIG. 7 illustrates an example of visual media depicting a vehicle.

The recognizer 310 can analyze a still frame of visual media to extract information. The extracted information could be text or other information, such as a distance between objects, a location of scene captured, etc. The still frame could be a single frame (e.g., a photograph) or a frame extracted from a video feed, such as the still frame 102 illustrated in FIG. 2. FIG. 6 illustrates an example of a still frame 400 that can with text that can be analyzed by the recognizer 310. As is illustrated, the still frame 400 includes a street sign depicting the intersection of "E 139 St" and "Cypress Av"). The high level of contrast between a sign's foreground and background makes edge detection during visual media analysis by the recognizer 310 more dependable. Additionally, as is illustrated in FIG. 7 in a still frame 450, text from exterior surfaces of vehicles, including text from either make (e.g., a manufacturer) and/or model designations from a vehicle license plate has a high contrast between the text and the background of the text.

Additionally, independent of whether text is extracted directly from the visual media using a method such as OCR or the text is extracted (derived) from meta-data associated with recognized landmarks/common-objects/faces, the text extracted from the visual media is very search-able, which can improve the chances of finding (e.g., extrapolating) any contextual information in the manner described herein.

In some examples, the recognizer 310 can include modules that can perform "edge processing" on the visual media. The edge processing can clearly identify areas within the visual media that should be further processed with other well-known recognition techniques and mechanisms and clearly identify the objects and/or areas within the visual media with which any found contextual information should be associated.

Figure 8:
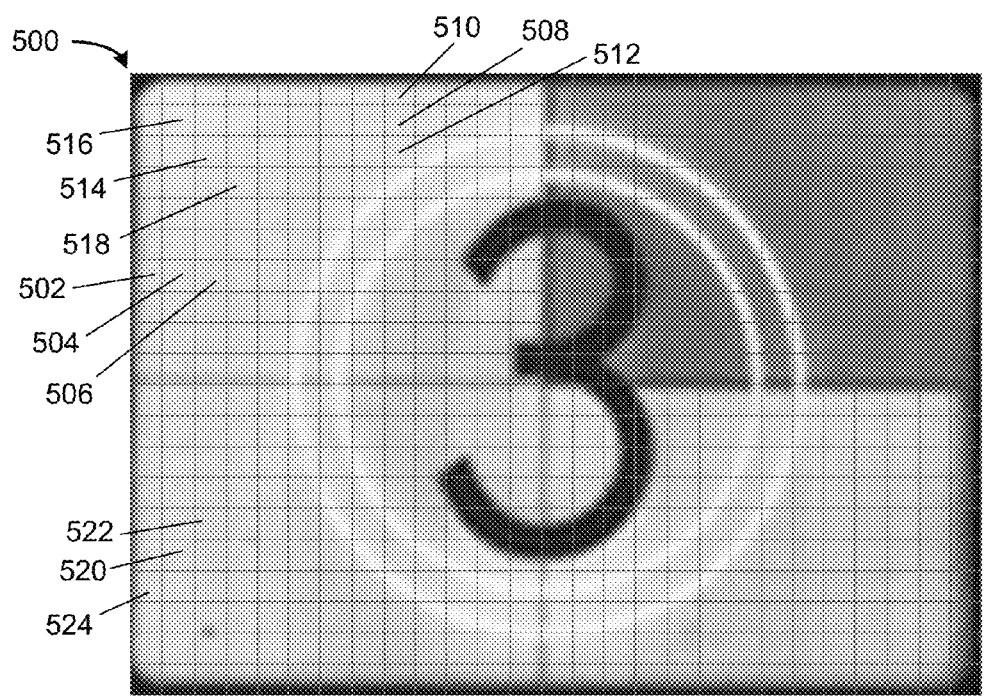
FIG. 8 illustrates an example of a horizontal scan, a vertical scan and two different diagonal scans of visual media as part of edge detection.

In particular, an edge identifier 312 of the recognizer 310 can perform "edge identification" on the visual media. FIG. 8 illustrates an example of the edge identifier 312 performing edge processing of a still frame 500. The edge identifier 312 can detect edges within the visual media can be detected by scanning pixels of the still frame 500 horizontally, such that a set of pixels 502, 504 and 506 represent a portion of a horizontal line of the still frame 500.

Additionally, the edge identifier 312 can scan the still frame 500 vertically to detect edges. For instance, the edge identifier can examine a single pixel at a specific offset within a collection of pixels representing a horizontal line 508 but then also examining pixels at the same offset in the horizontal lines either immediately preceding 510 or immediately succeeding 512 the current line. Yet further, the edge identifier 312 can identify edges within the still frame 500 that can also be detected by the edge identifier 312 scanning the visual media diagonally. For instance, in FIG. 8, the edge identifier 312 can examine a single pixel at a specific offset 514 and also examine pixels either at offset−1 ("minus one") 516 in the preceding line and offset+1 ("plus one") 518 in the succeeding line. Additionally or alternatively, the edge identifier 312 can examine a pixel at a specific offset 520 and also examining pixels at offset+1 ("plus one") 522 in the preceding line and offset−1 ("minus one") 524 in the succeeding line to find marked changes in pixel color and/or pixel intensity.

Figure 9:
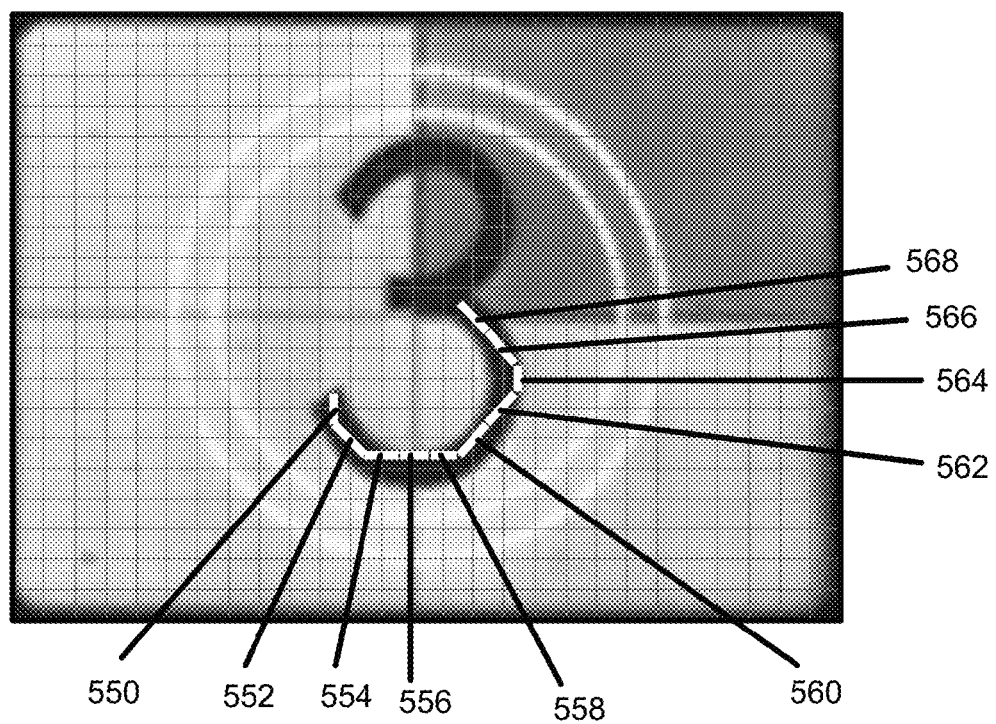
FIG. 9 illustrates an example of short segment identification of visual media resulting from edge detection.

Examination of such consecutive pixels (e.g., horizontal, vertical and/or diagonal) by the edge identifier 312 can reveal marked changes in color and/or intensity such that the edge identifier 312 can determine and save a location of a very short line segment to represent a portion of an edge. Detection of a collection of short (e.g., single pixel length) line segments can allow the edge identifier 312 to roughly identify an edge within the visual media. For instance, in FIG. 9 illustrates the still frame 500 of FIG. 8 with line segments 550, 552, 554, 556, 558, 560, 562, 564, 566 and 568 that can be combined to define a line segment or curve that is longer in length but is still only a single pixel wide.

Figure 10:
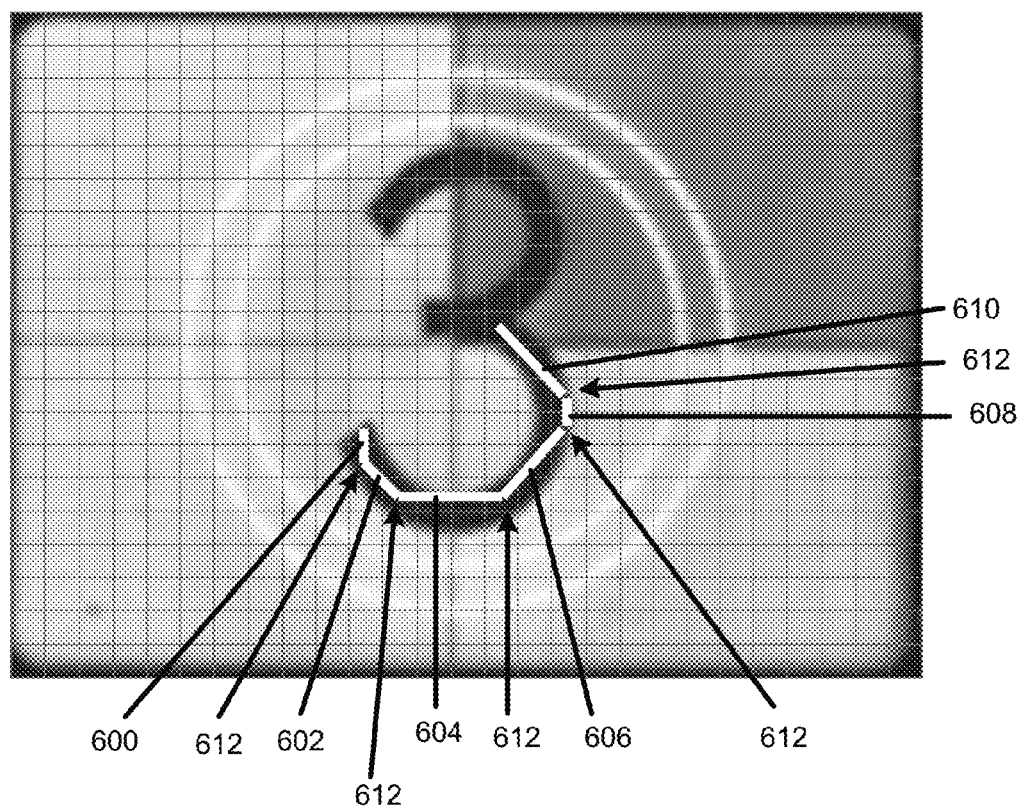
FIG. 10 illustrates an example of longer segment identification of visual media resulting from edge combination.

Upon the edge identifier 312 identifying rough edges in the visual media, an edge combiner 414 of the recognizer 310 can implement "edge combination" operations on the visual media. The edge combiner 314 (e.g., a subcomponent of the recognizer 310) can sort and collate the collection of single-pixel-length line segments identified by the edge combiner 312 to scan for segments with endpoints that are either coincident (e.g. using the same pixel) or very close to one another. FIG. 10 illustrates an example of the still frame 500 of FIG. 9 being scanned for possible edge combination matches. The edge combiner 314 can implement anti-aliasing techniques and curve-fit algorithms the such that single-pixel-length segments can be employed to build a second collection of line segments and curves 600, 602, 604, 606, 608 and 610 each of which are as long as possible. The edge combiner 314 can be programmed to make the new line segments and curves 600, 602, 604, 606, 608 and 610 as long as possible without including pixels on the other side of a "corner", such as the corners 612. As used herein, the corners 612 each represent a point where the endpoints of two (2) or more multi-pixel-length line segments or curves that have distinctly different slope or aspect and are either coincident or very close to one another.

The edge combiner 314 can be configured such that if the endpoints of two (2) multi-pixel length line segments 550, 552, 554, 556, 558, 560, 562, 564, 566 and/or 568 (of FIG. 9) are coincident or very close to one another and both line segments have the same or very similar slope/aspect then the two line segments can be combined into a single line segment whose length is equal to the sum of the two former line portions 604, 606 and 610. Additionally, the edge combiner 314 can be programmed such that if the endpoints of two (2) multi-pixel-length curves are coincident or very close to one another and both curves have very similar curvature then the two curves can be combined into a single curve with a length equal to the sum of the two former curves portions. In this manner, a relatively large set of single-pixel-length line segments can be reduced by the edge combiner 314 into a smaller set of multi-pixel-length line segments and curves each of which can defines an "edge" within the digital media.

Figure 11:
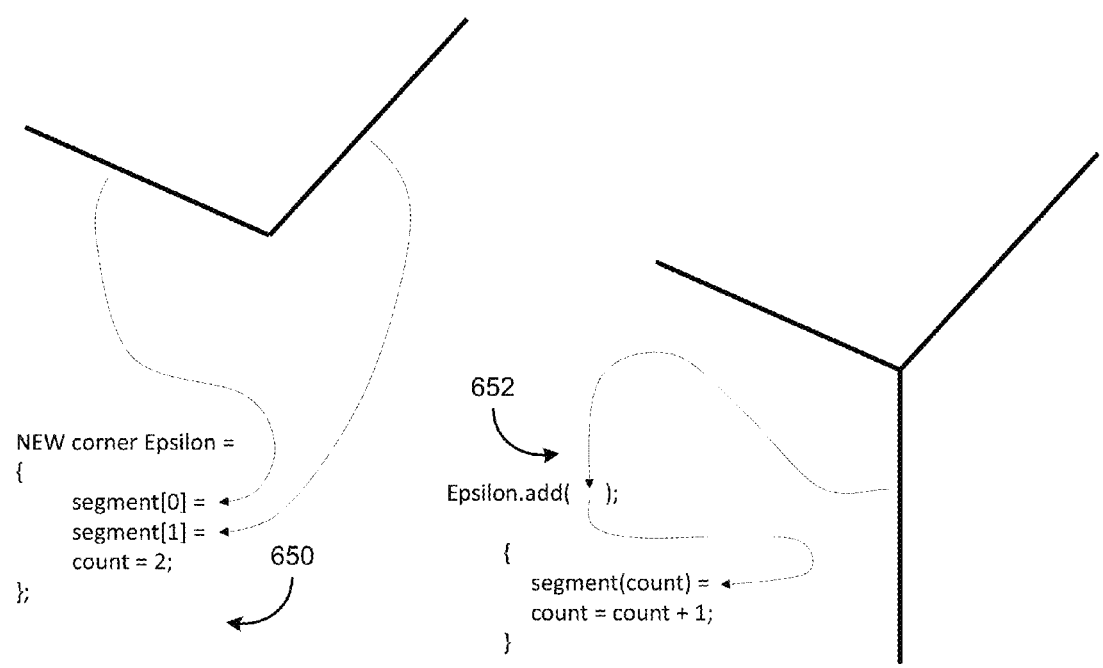
FIG. 11 illustrates an example of corner recognition and associated pseudo code.

Upon determining the set of multi-pixel-line segments, the edge combiner 314 can provide the set of multi-pixel-line segments to a corner recognizer 316 (e.g., a subcomponent) of the recognizer 310. The corner recognizer 316 can scan the visual media for lines and curves within the set of multi-pixel-line segments created by the edge combiner 314 that have endpoints that are either coincident or near one another but whose slope, aspect or curvature is different enough that the separate elements were not combined into a single element. FIG. 11 illustrates conceptualized examples of corner recognition by the corner recognizer 316 and associated pseudo code. The corner recognizer 316 can be configured such that upon detecting such a situation, the corner recognizer 316 can either create a new "corner record", such as the corner record 650 that references two line elements. Alternatively, the corner recognizer 316 can modify an existing corner record to add another line element reference, as is illustrated in FIG. 11 at 652. Moreover, the corner recognizer 316 can be configured to modify an existing corner record in situations in which more than two (2) edges come together. Thus, as used herein the term "corner" is not solely limited to a point at which only two (2) edges come together. Instead, as used herein, a "corner" denotes a point (or small area) where multiple line segments are either coincident or near one another but whose slope, aspect or curvature is sufficiently different that the separate elements were not combined into a single element.

The corner records and the set of multi-pixel-line segments can be provided to a shape recognizer 318 that can be configured to implement geometric shape recognition. For example, the shape recognizer 318 can implement pattern matching to identify a geometric pattern from the set of multi-pixel-line segments and corner records. For instance, the shape recognizer 318 can evaluate collections of line segments, curves, and corners. If a collection is comprised only of straight line segments and corners then a simple corner count by the shape recognizer 318 may identify whether the shape is a triangle, some form of quadrilateral (e.g. four sides and four corners), a pentagon (5), a hexagon (6), a heptagon (7), an octagon (8), or decagon (10).

Figure 12:
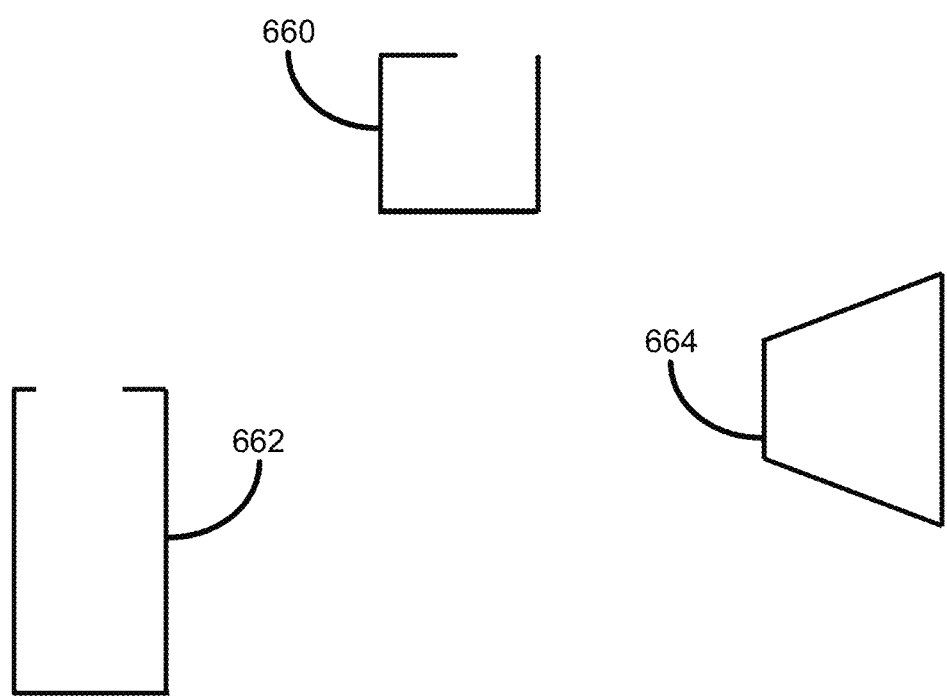
FIG. 12 illustrates examples of shape recognition where parts of the shapes are obscured or the shape is skewed by perspective.

The shape recognizer 318 can be programmed such that if a shape has the correct number of segments but one too few corners then a corner or line segment that was occluded in the digital media may be inferred. FIG. 12 illustrates situations where incomplete information is available for the shape recognizer 318. For instance, in FIG. 12, a shape 660 has the correct number of segments four (4) for a square, but too few corners, such that a line segment occluded in the digital media may be inferred (e.g., added) by the shape recognizer 318. Similarly, a shape 662 has the correct number of corners four (4) for a rectangle, but too many segments, such that another line segment occluded in the digital media may be inferred by the shape recognizer 318.

Moreover, a relatively high percentage of human made objects are square or rectangular in shape. Accordingly, if a particular quadrilateral is recognized as a trapezoid then the quadrilateral may in fact be a square or rectangle that appears trapezoidal because of skew or perspective, such as the shape 664. Accurate estimates of skew and perspective can be derived if several such trapezoidal shapes by detected the shape recognizer 318 in the visual media all have similar trapezoidal characteristics even if the precise size of the squares and rectangles is not known. Upon identifying geometric shapes in the visual media, the shape recognizer 318 can return data characterizing the location and type of geometric shape to the analysis master control 308. Additionally, the set of multi-pixel-line segments and corner records can also be returned to the analysis master control 308.

Similarly, a relatively high percentage of human made objects are circular in shape. Accordingly, the shape recognizer 318 can be configured such that if a collection of line segments includes only curves either with zero (0) corners or some small number of corners and the gestalt of the curves matches an ellipse then the shape can be determined by the shape recognizer 318 to be a circle that appears elliptical because of skew or perspective.

In some examples, the analysis master control 308 can examine the returned data to arbitrate between different subcomponents of the recognizer 310 for further analysis. For example, the analysis master control 308 can provide the set of multi-pixel-line segments and corner records and the location and type of detected geometric shapes to an OCR 320 module of the recognizer 310. The OCR 320 can implement OCR (or other techniques) to identify text based on the set of multi-pixel-line segments and corner records. The text extracted by the OCR 320 can be returned to the analysis master control 308. Additionally, the analysis master control 308 can provide the set of multi-pixel-line segments and corner records to an automatic number plate recognition (ANPR) 322 module of the recognizer 310. The ANPR 322 can recognize and extract a specific type of text from the visual media, namely text included in a license plate. The text extracted from the ANPR 322 can be returned to the analysis master control 308.

Further, the analysis master control 308 can provide the set of multi-pixel-line segments and corner records as well as the recognized geometric shapes to a sign recognizer 324 of the recognizer 310. The sign recognizer 324 can implement pattern matching on the geometric shapes to identify street signs and/or advertisements that may be present in the visual media. Geometric shape recognition can be useful since many of the items human beings manufacture come in regular, geometric shapes, such as circles, squares, rectangles, triangles, octagons, etc. Moreover, interesting information pertaining to visual media can be derived from the depiction of a geometric shape if it is known that an element within visual media is, in fact, a particular geometric shape. For instance, the sign recognizer 324 may be able to determine if the shape is an octagon, the color is red, and contains the word "STOP", such that a particular geometric shape defines the boundaries of a stop sign. The type and location of recognized signs can be returned to the analysis master control 308.

Figure 13:
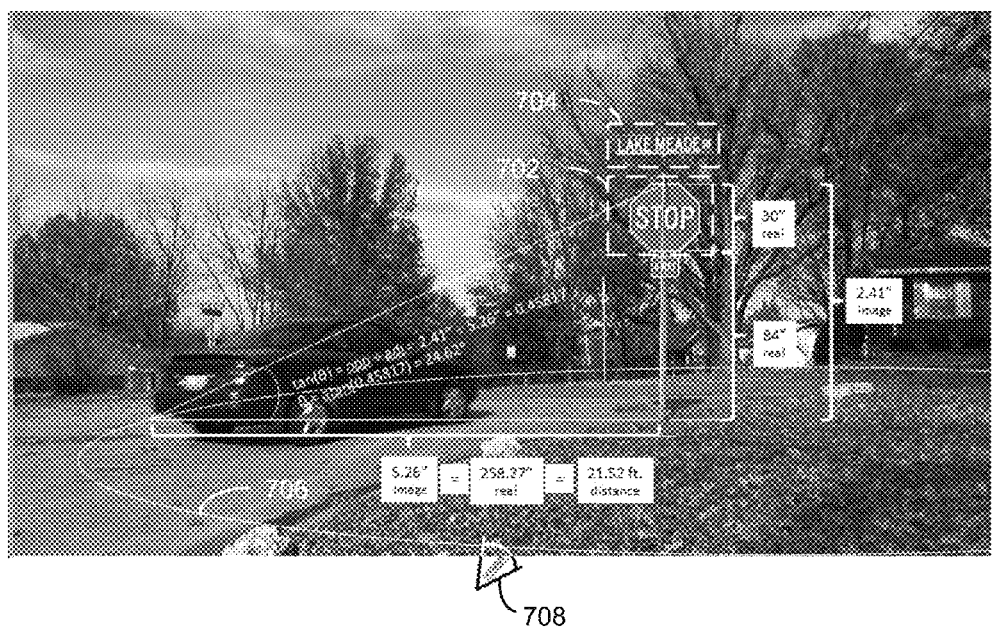
FIG. 13 illustrates an example of distance and perspective computation from visual elements in visual media whose dimensions are known.

Additionally, the sign recognizer 324 can be configured to determine that rectangles within the visual media that are dark green or dark blue with white lettering may also be street signs with street names, although the size of street signs may vary from town to town. In a second example (hereinafter, "the second example"), FIG. 13 illustrates a frame 700 that can be analyzed by the sign recognizer 324. The frame 700 can include a stop sign 702 and a street sign 704 that can be recognized by the sign recognizer 324.

Further, the text (e.g., extracted by the OCR 320) on a street sign can provide important context with regard to location. For instance, if the visual media includes two (2) or more street signs, the location can be determined quite accurately (e.g., a specific intersection of streets).

The location of the recognized signs can be returned to the analysis master control 308. The analysis master control 308 can provide the recognized signs, the extracted text, the recognized shapes, and the line segments to a distance estimator 326 of the recognizer 310. Based on the information provided, the distance recognizer 326 can estimate perspective (e.g., a viewing point) for the visual media. The source of the visual media can be, for example, a position at which the visual media is captured.

The distance estimator 326 can be configured such that if a collection of elements shows some of the properties (e.g. eight corners, red, "STOP") that suggest it's a stop sign but there is some curvature in some of the intra-corner segments then it's possible that the visual media was recorded with some kind of wide angle or "fish-eye" lens. In such a situation, the distance estimator 326 can compare similar distortions from both right and left sides as well as top and bottom of the visual media that may allow the amount of curvature to be accurately computed so that an "un-curved" version of the visual media could be created for the value of comparison to increase accuracy of estimates.

In the second example, as is illustrated in FIG. 13, the known height of the stop sign 702 allows the determination of a scale in the visual media 700. Determination of the scale allows for the determination of other distances between objects in the visual media 700. For instance, as is illustrated in FIG. 13, the distance between a vehicle and the stop sign 702 can be calculated using trigonometry. Additionally, as is illustrated by the circle 706 the location of an "oculus" 708 (e.g., a focal point of a camera taking the visual media) can be estimated, thereby providing a relatively accurate estimate of the perspective.

The estimate of perspective can allow the distance recognizer 326 to estimate distances both from the source of the visual media (e.g., the oculus 708 of FIG. 13) and the distance between objects in the visual media. It is noted that the more accurate the estimate of perspective becomes, the more accurate the distance estimates also becomes.

Similarly, the analysis master control 308 can provide the set of multi-pixel-line segments and corner records as well as the recognized geometric shapes to a face recognizer 328 of the recognizer 310. The face recognizer 328 can be employed to implement a facial recognition algorithm on the visual media to determine a possible identity for an individual (e.g., a person) included in the visual media.

This list of components of the recognizer 310 is not meant to be exhaustive. In other examples, additional or alternative features can be extracted from the visual media to form extracted information. The extracted information, including the text extracted from the visual media can be provided to an information finder 330 that can request additional information based on the extracted information to further add to the contextual information describing the visual media.

The information finder 330 could be implemented on a server implementing the analysis master control 308 or could be implemented on a separate server. The information finder 330 can employ the information extracted from the visual media to search for additional contextual information.

The information finder 330 can be configured to implement a search for contextual information. In some examples, the information finder 330 can include an interface to a commercial search engine, such as interface for a GOOGLE™, YAHOO™ and/or BING™ search. Additionally, or alternatively, the information finder 330 can query multiple disparate information sources 331 for each a word or phrase/title derived from the visual media (or some subset thereof) to collect (e.g., extrapolate) as much contextual information as possible. The information sources 331 can include but are not limited to:
  generalized web searches for web sites 332
    preferably web sites containing whole phrases/titles
    + web sites in which several words in a group are found separately
  Better Business Bureau (BBB) records 334
  Telephone directory 336
    Business directory records; localized if any location information is available
    Yellow Pages records
  Department of Motor Vehicle (DMV) records 338
  City and County Assessor's Office records 340
  Military records 342
    Unclassified/Declassified Military records
    Classified Military records, if allowed by the Dept. of Defense (DoD)
  Local Law Enforcement records 344
    Federal Law Enforcement records
    FBI records
    Department of Homeland Security (DHS) records
    US Marshals Service records
    US Border Patrol records
    US Secret Service records
  Library of Congress records 346
  Commercial Records 348
    Records built and maintained by commercial entities
    Wireless™ SMART911™ database
  Nearly any other source of relevant information In some situations, the information finder 330 can include logic for arbitrating between querying the various information sources 331. In other examples, the information finder 330 can be programmed to query each of the information sources 331. Upon receiving information from the information sources 331, the information finder 330 can forward the information received from the information sources 331 to the analysis master control 308.

The analysis master control 308 can compare and collate the information provided by the information sources 331 and the information extracted from the visual media. For example, the analysis master control 308 can identify matches made between phrases and titles extracted from the visual media with phrases and titles of information received from the information sources 331 to form extrapolated information. The analysis master control 308 can apply a weighting function to collate the contextual information (information extracted from the visual media and information received from the information sources 331) wherein matches between whole phrase/titles can be weighted the most heavily. Similarly, matches made using several words in a group that were found separately can be weighted less than whole phrases/titles but can be weighted more heavily than matches between single words. Matches made using single word matches can be weighted least heavily. In other examples, alternative weights can be applied. In this manner contextual information for the visual media can include both extracted information (e.g., information extracted directly from the visual media) and extrapolated information (e.g., information received from the information sources 331 that matches/corresponds to some portion of the extracted information).

Additionally, in some examples, upon determining certain portions of extrapolated information, the analysis master control 308 can cause the information finder 330 to search for additional information. For example, license plate numbers extracted from the visual media can be employed by the information finder 330 to query DMV records 338 to determine an owner of a vehicle. Upon determining the owner of a vehicle, the analysis master control 308 can cause the information finder 330 to query the telephone directory 336 for contact information (e.g., a telephone number and/or an address) of the owner of a vehicle. Similarly, upon matching a name of a street with a name on a street sign in the visual media, the analysis master control 308 can cause the information finder to search the general interest 332 (e.g., a map service) for a map to determine a location of the scene captured by the visual media.

The analysis master control 308 can provide a presentation builder 350 with the visual media and the contextual information (e.g., both the extracted information and the extrapolated information). The presentation builder 350 can organize and format the visual media and the contextual information into a contextual document for display (e.g., as a web page, an Extensible Markup Language (XML) document or similar document).

Figure 14:
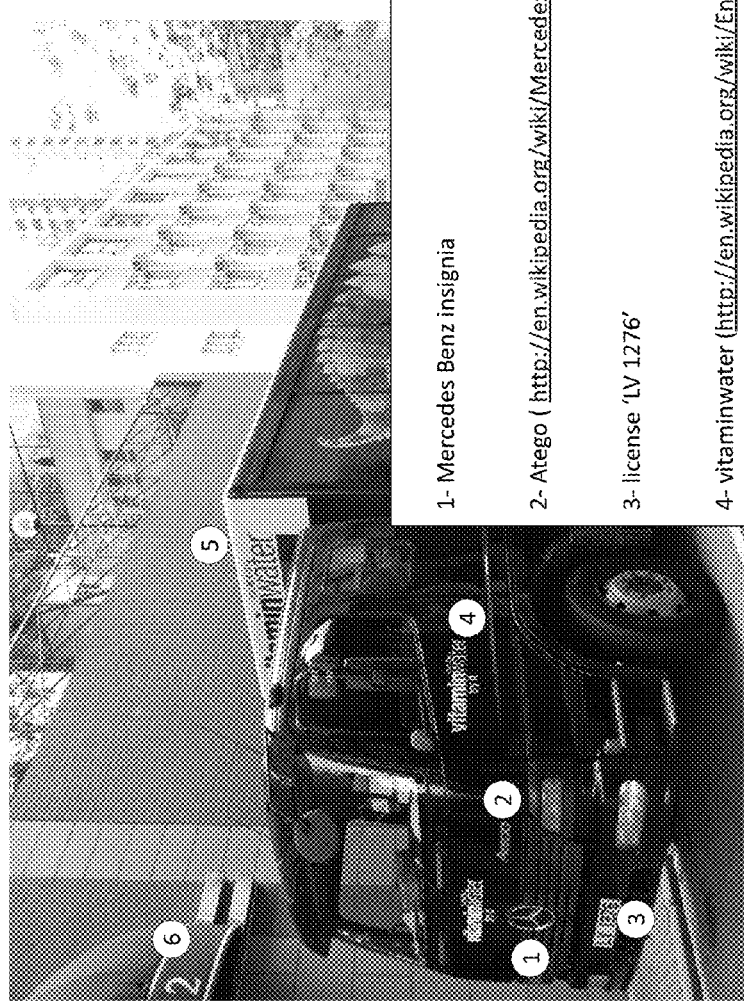
FIG. 14 illustrates an example of a contextual document including media footnoting with attendant text representation of contextual information.

FIG. 14 illustrates an example of a contextual document wherein the still frame 450 of FIG. 7 is illustrated as the contextual document that includes contextual information 452 that includes both extracted information and extrapolated information. As is illustrated in FIG. 14, the contextual information 452 can be output as a series of uniform resource locators (URLs) that correspond to information extracted and/or extrapolated from the still frame 450 (e.g., visual media). As illustrated in FIG. 14, footnote-like numeric values overlaying specific areas of the still frame 450 correspond to particular URLs.

Figure 15:
FIG. 15 illustrates another example of a contextual document that includes a media element highlighting with an example of an interactive popup containing text.

Additionally or alternatively, the contextual document generated by the presentation builder 350 can be formatted for a display technology that is highly interactive and user friendly. FIG. 15 illustrates an example of the still frame 450 illustrated in FIG. 4 as a contextual documents in another format. As illustrated in FIG. 15, the contextual document can include the still frame 450 along with an interactive overlay on top of the still frame 450. The contextual document can include outlines 462. The overlay can include outlines 462 that can be associated with some form of hyperlink that, when activated by a viewer (e.g., in response to user input) of the contextual document, manifests a pop-up dialog box 464 that includes contextual information (e.g. extracted information and/or extrapolated information) that has been found and can be displayed as text. URLs associated with web sites could also be hyperlinked within the pop-up 464 such that if the viewer chooses to examine the associated web site URL hyperlink can be activated to invoke a web browser that is directed to the corresponding website.

It is to be understood that in other examples, many other types of contextual documents can be formed from the contextual information. For example, in some situations, the still frame 450 can be omitted and/or initially obscured to avoid traumatizing emergency services dispatchers. Additionally, in some examples, the contextual document can be formatted for printing by a printer.

Referring back to FIG. 5, the presentation builder 350 can forward the analysis master control 308 the contextual document. The analysis master control 308 can provide the MCIR 302 with the contextual document. The GUI 304 can output the contextual document to a user. The user can employ the contextual document to take appropriate action, including dispatching emergency services and/or other services. Additionally, the GUI 304 can include an option to forward the contextual document or other document that includes the visual media and the contextual information to a third party, including the dispatched emergency services (e.g., first responders).

By employing the system 300, contextual information can be extracted and extrapolated for visual media. Moreover, the system 300 needs no guidance as to the content of the visual media in order to extract and extrapolate the contextual information. That is, the system 300 can derive the contextual information for the visual media without being given information that biases the system 300 to any particular content. In this manner, the system 300 can be employed in a wide range of applications.

Figure 16:
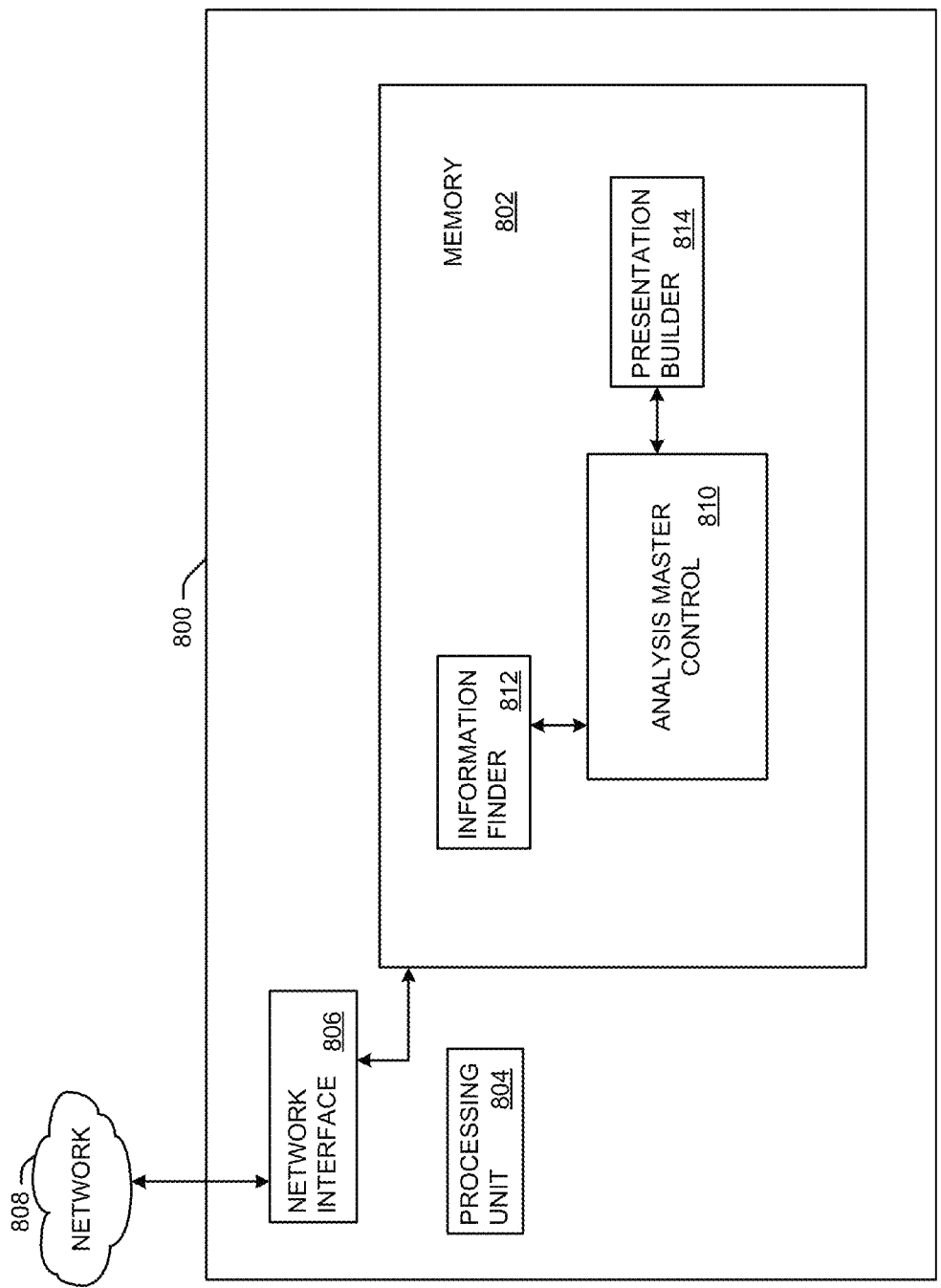
FIG. 16 an example of a computer system for implementing features of a system for determining contextual information of visual media.

FIG. 16 illustrates an example of a computer system 800 that could be employed to implement components of the system 50 of FIG. 1 and/or components of the system 300 illustrated in FIG. 5. The computer system 800 can include a memory 802 that can store machine readable instructions. The memory 802 could be implemented, for example, as non-transitory computer readable media, such as volatile memory (e.g., random access memory), nonvolatile memory (e.g., a hard disk drive, a solid state drive, flash memory, etc.) or a combination thereof. The computer system 800 can also include a processing unit 804 to access the memory 802 and execute the machine-readable instructions. The processing unit 804 can include, for example, one or more processor cores. The computer system 800 can include a network interface 806 configured to communicate with a network 808. The network interface 806 could be implemented, for example, as a network interface card. The network 808 could be implemented for example, as a public network (e.g., the Internet), a private network (e.g., proprietary network) or a combination thereof (e.g., a virtual private network).

The computer system 800 could be implemented, for example in a computing cloud. In such a situation, features of the computer system 800, such as the processing unit 804, the network interface 806, and the memory 802 could be representative of a single instance of hardware or multiple instances of hardware with applications executing across the multiple of instances (i.e., distributed) of hardware (e.g., computers, routers, memory, processors, or a combination thereof). Alternatively, the computer system 800 could be implemented on a single dedicated server.

The knowledge-based system 200 can include an analysis master control 810. The analysis master control 810 can be employed, for example, to implement the analysis master control 58 illustrated in FIG. 1 and/or the analysis master control 308 illustrated in FIG. 5. The analysis master control 810 can be implemented, for example, as an artificial intelligence system/engine that can analyze visual media provided received from an external source such as the MCIR 52 illustrated in FIG. 1 and/or the MCIR 302 illustrated in FIG. 5.

The visual media can be, for example, a still frame and/or a series of consecutive frames (e.g., video) taken at a particular location. The analysis master control 810 can provide the video to a recognizer (e.g., the recognizer 310 illustrated in FIG. 5) via the network interface 806. The recognizer can extract contextual information describing specific objects in the visual media, including, but not limited too lines, shapes, faces, street signs, distances between objects, etc., in the manner described herein. The extracted information can be returned to the analysis master control 810.

The analysis master control 810 can provide the extracted information to an information finder 812. The information finder 812 could be implemented, for example, in a manner similar to the information finder 62 of FIG. 1 and/or the information finder 330 of FIG. 5. The information finder 812 can query information sources (e.g., search engines, databases, etc.) via the network interface 806 for information based on the extracted information. The information sources could be implemented, for example, as the information sources 331 illustrated in FIG. 5. The information finder 812 can return information provided from the information sources to the analysis master control 810. The analysis master control 810 can parse the extracted information with the information received from the information sources to identify matches to form extrapolated information. Contextual information including the extracted information and the extrapolated information can be provided to a presentation builder 814.

The presentation builder 814 could be implemented, for example, in a manner similar to the presentation builder 350 illustrated in FIG. 5. The presentation builder 814 can organize the contextual information and the visual media to form a contextual document (e.g., a web page, an XML document or other document). The presentation builder 814 can return the contextual document to the analysis master control 810. The analysis master control 810 can provide the contextual document to the MCIR via the network interface 806. A user of the MCIR can view the contextual document and take the appropriate action (e.g., deploy emergency services).

Figure 17:
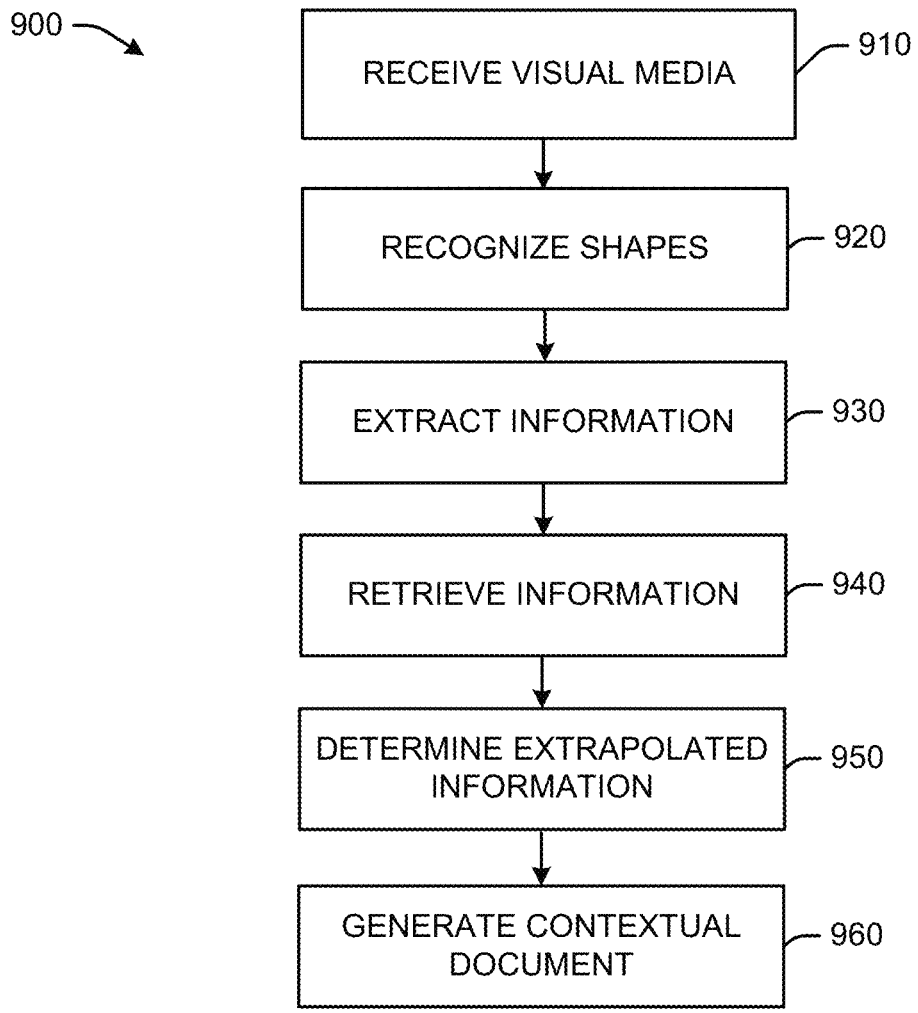
FIG. 17 illustrates a flowchart of an example method for determining contextual information of visual media.

In view of the foregoing structural and functional features described above, an example method will be better appreciated with reference to FIG. 17. While, for purposes of simplicity of explanation, the example method of FIG. 17 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 17 can be implemented as instructions stored in a non-transitory machine-readable medium. The instructions can be accessed by a processing resource (e.g., one or more processor cores) and executed to perform the methods disclosed herein.

FIG. 17 illustrates a flowchart of an example method 900 for extracting and extrapolating contextual information for visual media. The method 900 could be implemented, for example, by the system 50 illustrated in FIG. 1, the system 300 illustrated in FIG. 5 and/or the computer system 800 illustrated in FIG. 16. At 910, visual media can be received at an analysis master control (e.g., the analysis master control 58 of FIG. 1 and/or the analysis master control 308 of FIG. 5). The visual media can be provided from an MCIR, such as the MCIR 52 illustrated in FIG. 1 and/or the MCIR 302 illustrated in FIG. 5. The visual media can originate from a camera, such as a traffic camera, a security camera or a handheld camera.

At 920, shapes in the visual media can be recognized by a recognizer (e.g., the recognizer 60 illustrated in FIG. 1 and/or the recognizer 310 illustrated in FIG. 10.). The shapes can include, for example, line segments, lines, street signs, polygons, text, faces, etc. At 930, information corresponding to the recognized shapes can be extracted by the recognizer. The extracted information can include data characterizing features captured in the visual media, including text, street signs, an indemnity of individuals photographed, etc.

At 940, an information finder (e.g., the information finder 62 illustrated in FIG. 1 and/or the information finder 330 illustrated in FIG. 5) can query information sources for additional information based on the extracted information. The information sources could be external sources, such as search engines and/or databases. The information sources could be implemented, for example, in a manner similar to the information sources 331 illustrated in FIG. 5. At 950, the analysis master control can match information received from the information sources with extracted information to derive extrapolated information. The contextual information for the visual media can include both the extracted information and the extrapolated information. At 960, a presentation builder (e.g., the presentation builder 350 of FIG. 5) can generate a contextual document that includes the visual media and the contextual information.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine executable instructions comprising:
an analysis master control configured to derive contextual information of visual media that includes extracted information and extrapolated information, wherein the analysis master control receives the extracted information characterizing visual media from a recognizer; and
an information finder configured to query a plurality of information sources for information based on the extracted information;
wherein the analysis master control is further configured to match information received from the information sources with the extracted information to form the extrapolated information that characterizes the visual media.

2. The medium of claim 1, wherein the visual media is a still frame.

3. The medium of claim 2, wherein the contextual document includes text and a hyperlink characterizing content of the visual media.

4. The medium of claim 1, further comprising a presentation builder configured to generate a contextual document that includes the visual media and the contextual information.

5. The medium of claim 1, wherein the recognizer is further configured to:
- identify line segments in the visual media;
- identify a shape in the visual media based on the line segments; and
- identify text in the visual media base on at least one of the identified line segments and shape.

6. The medium of claim 5, wherein the recognizer is further configured to identify a corner between line segments in the visual media.

7. The medium of claim 6, wherein the recognizer is further configured to estimate a distance between objects in the visual media based on the identified street sign.

8. The medium of claim 6, wherein the recognizer is further configured to estimate a perspective of the visual media based on the identified street sign.

9. The medium of claim 6, wherein the recognizer is further configured to identify a street sign in the visual media based on the identified shape.

10. The medium of claim 1, wherein the information finder is further configured to query a search engine based on the extracted information.

11. The medium of claim 1, wherein the information finder is further configured to query a database based on the extracted information.

12. The medium of claim 1, wherein the contextual information includes text that characterizes a location corresponding to the visual media.

13. The medium of claim 1, wherein the contextual information includes text that characterizes a make of a vehicle in the visual media.

14. The medium of claim 1, wherein the contextual information includes text that characterizes a business name included in the visual media.

15. The medium of claim 1, wherein the contextual information includes text that characterizes a partial address included in the visual media.

16. A system comprising:
- a media content information resolver (MCIR) configured to receive visual media from a media source;
- an analysis master control configured to derive contextual information for the visual media that characterizes information extracted from the visual media and information extrapolated for the visual media based on the extracted information; and
- a presentation builder configured to generate a contextual document for the MCIR based on the contextual information.

17. The system of claim 16, further comprising an information finder configured to query a plurality of information sources for information based on the extracted information to facilitate determination of the extrapolated information.

18. The system of claim 16, wherein the MCIR is further configured to output the contextual information for the visual media via a graphical user interface (GUI).

* * * * *